Aug. 31, 1965 W. R. HICKS 3,203,333
APPARATUS FOR MAKING COPIES BY DIRECT CONTACT PRINTING
Filed Jan. 15, 1963 4 Sheets-Sheet 1

INVENTOR.
Walter R. Hicks
BY Emery, Whittemore
Sandoe & Graham
ATTORNEYS

Aug. 31, 1965   W. R. HICKS   3,203,333
APPARATUS FOR MAKING COPIES BY DIRECT CONTACT PRINTING
Filed Jan. 15, 1963   4 Sheets-Sheet 2
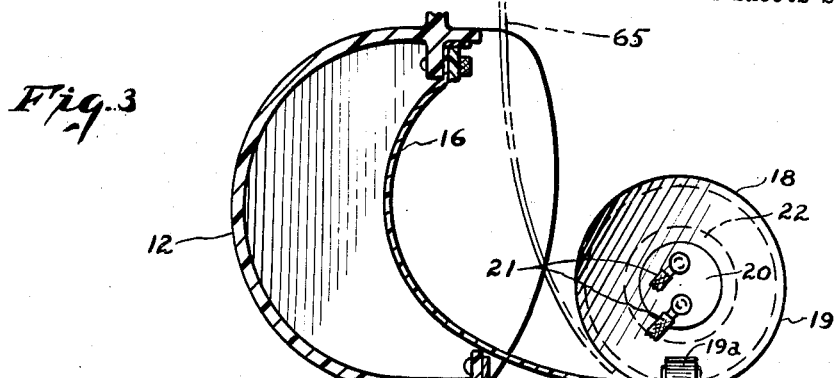
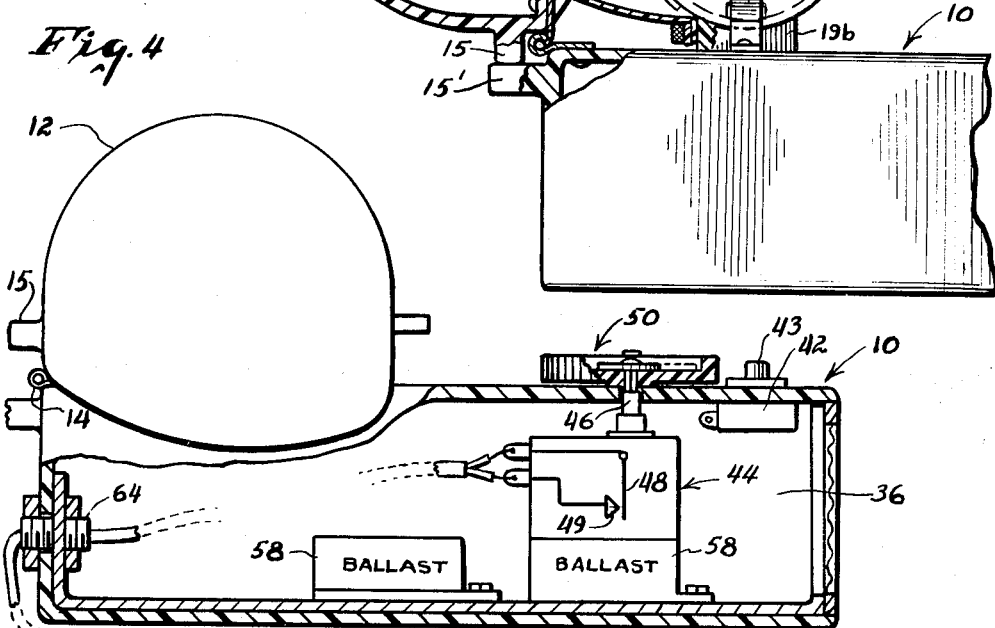
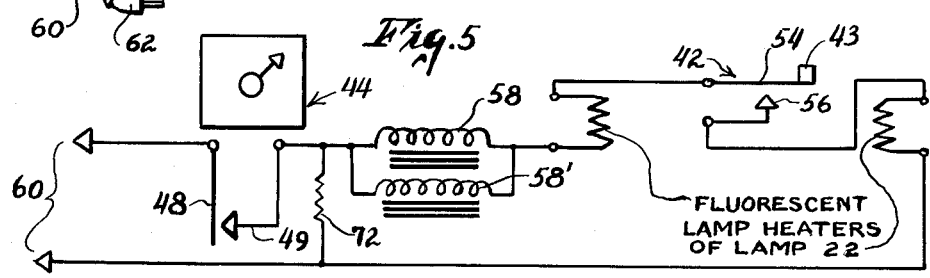
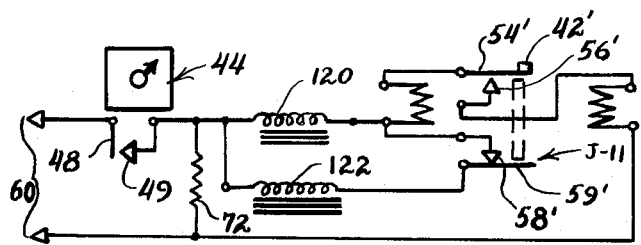
INVENTOR.
Walter R. Hicks
BY Emery, Whittemore
Sandoe & Graham
ATTORNEYS Aug. 31, 1965  W. R. HICKS  3,203,333
APPARATUS FOR MAKING COPIES BY DIRECT CONTACT PRINTING
Filed Jan. 15, 1963  4 Sheets-Sheet 3
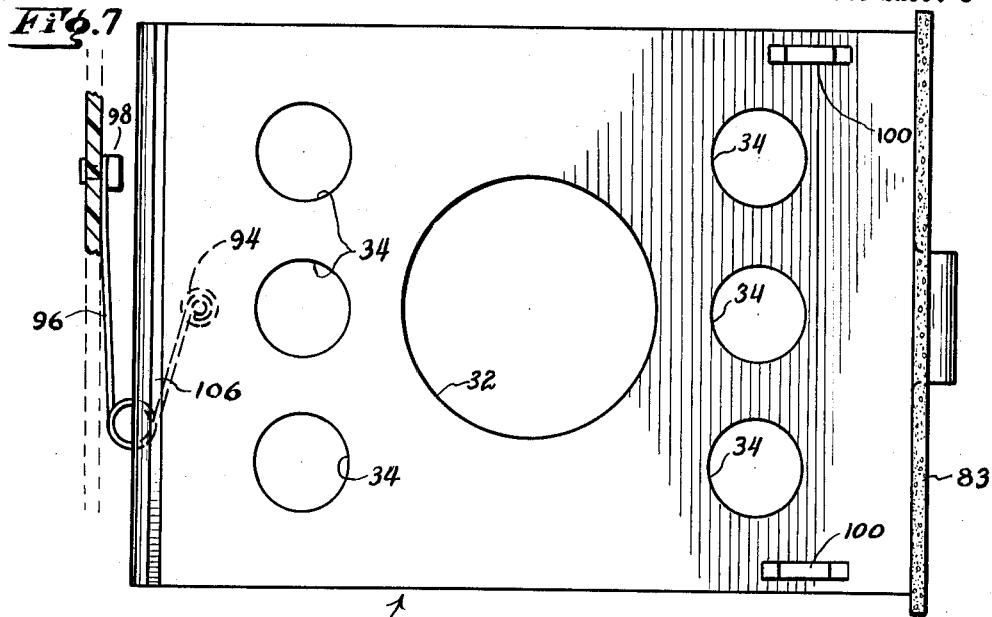
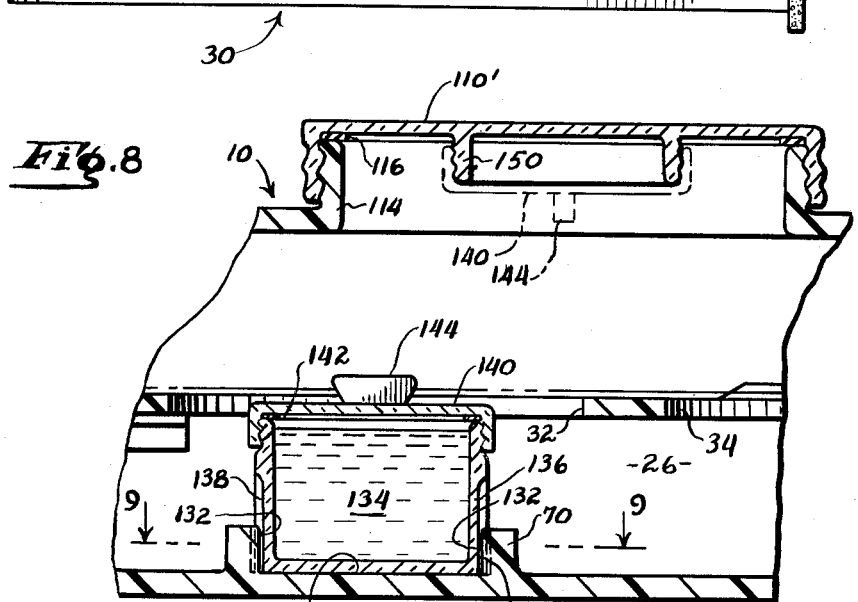
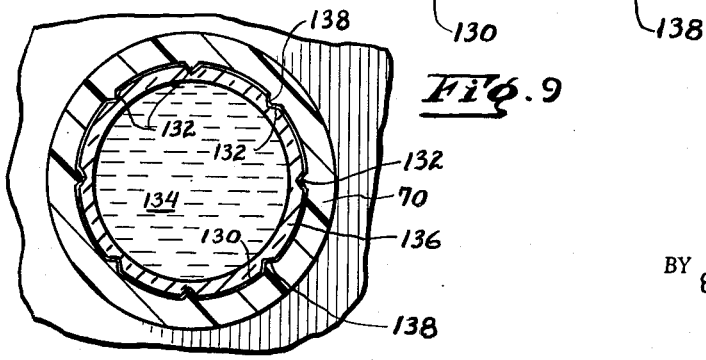
INVENTOR.
Walter R. Hicks
BY Emery, Whittemore,
Sandoe & Graham
ATTORNEYS

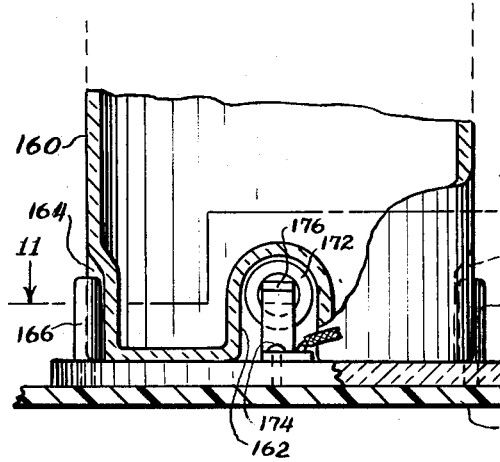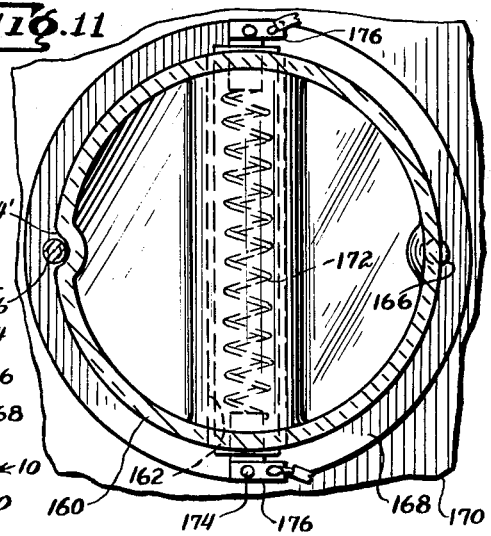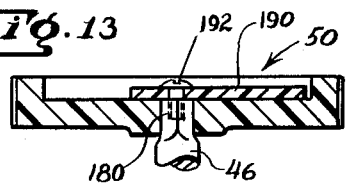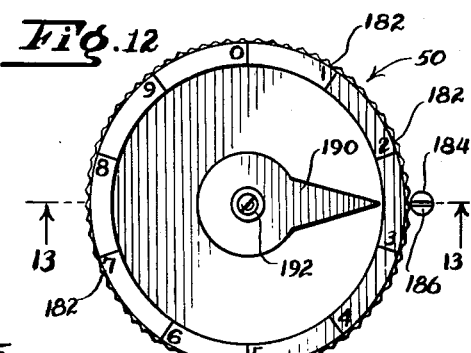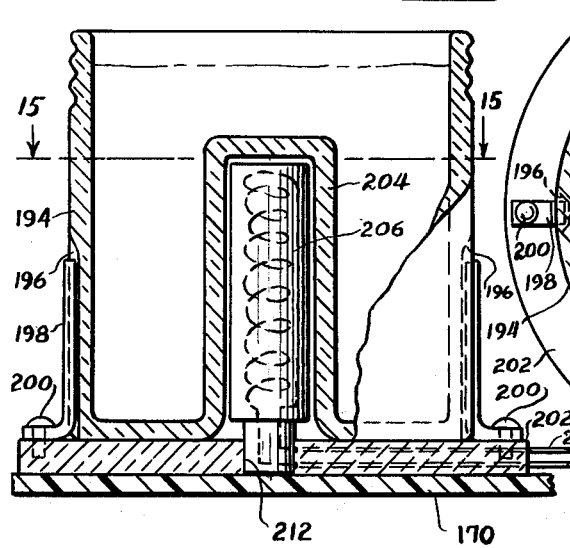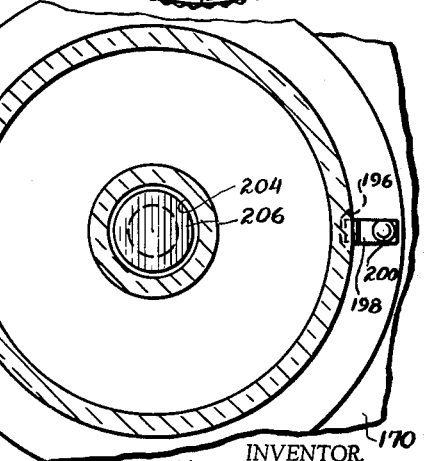

United States Patent Office 3,203,333
Patented Aug. 31, 1965

3,203,333
APPARATUS FOR MAKING COPIES BY DIRECT CONTACT PRINTING
Walter Robert Hicks, Manhasset, N.Y., assignor to Reeves Industries, Inc., a corporation of New York
Filed Jan. 15, 1963, Ser. No. 251,531
8 Claims. (Cl. 95—77.5)

This invention relates to machines for making copies of letters, drawings, recipes and other written material.

It is an object of the invention to provide a simplified copying machine which is less expensive to manufacture than comparable machines of the prior art; and which can be used by operators without special training.

The invention is an improvement in machines for making contact prints on sensitized paper such as diazo paper. One feature of the invention relates to the holder by which the paper is wrapped around a transparent or translucent support through which light is projected to make the print. Another feature of the invention relates to the provision of a chamber in the base of the machine for processing the exposed paper.

Other objects, features and advantages of the invention will appear or be pointed out as the description proceeds.

In the drawing, forming a part hereof, in which like reference characters indicate corresponding parts in all the views:

FIGURE 3 is a fragmentary view, partly in section, on the line 3—3 of FIGURE 1, showing the cover in open position;

FIGURE 4 is a diagrammatic view, partly in section, on the plane 4—4 of FIGURE 1, showing the location of apparatus for the light control;

FIGURES 5 and 6 are wiring diagrams for different modifications of the invention;

FIGURE 7 is a top plan view of the partition plate that is used in the gas chamber for developing the copy;

FIGURE 8 is a diagrammatic sectional view showing a modified construction of the invention;

FIGURE 9 is a sectional view on the line 9—9 of FIGURE 8;

FIGURE 10 is a fragmentary view, partly in section, showing another modified construction for holding the material for supplying the ammonia gas;

FIGURE 11 is a sectional view taken on the line 11—11 of FIGURE 10;

FIGURE 12 is a greatly enlarged plan view showing the knob for setting the timer;

FIGURE 13 is a sectional view on the line 13—13 of FIGURE 12;

FIGURE 14 is a fragmentary view, partly in section, showing still another modified construction for holding the material that generates ammonia gas; and FIGURE 15 is a sectional view on the line 15—15 of FIGURE 14.

Figure 1:
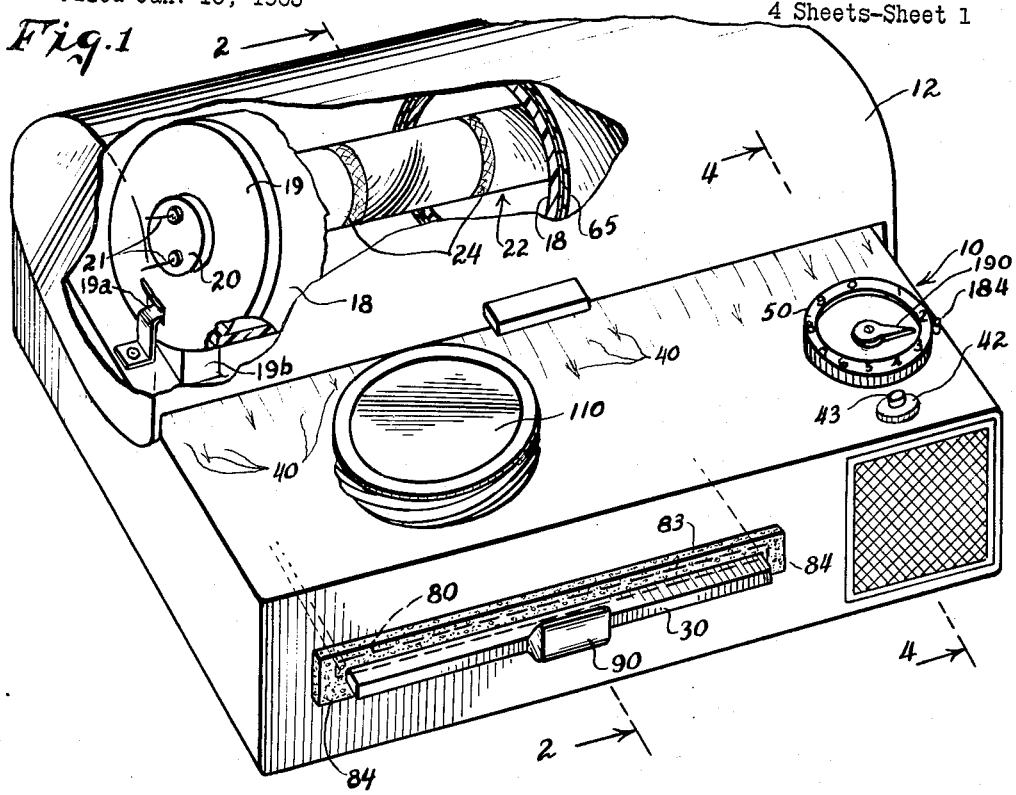
FIGURE 1 is a perspective view showing the top, front and one side of a copying machine made in accordance with this invention.

A molded plastic base cabinet 10 has externally-mounted components enclosed by a molded plastic cover 12, which is connected to the cabinet by a hinge 14. This hinge can be integrally molded so as to permanently join the cabinet 10 and cover 12, with the hinge composed of the same plastic material as the cabinet and cover, capable of withstanding successive flexures of opening and closing in excess of 1,000,000 movement cycles. Alternately, the cabinet 10 and the cover 12 can be joined by a conventional hinge 14 of the piano-leaf type. A plastic flexible sheet 16, preferably transparent, is attached to the cabinet top along one horizontal edge. Stops 15 and 15′ on the cover 12 and cabinet 10, respectively, limit the opening of the cover.

The opposite horizontal edge is attached to the inner surface of the cover 12. The sheet 16 exposes the surface of a transparent plastic cylinder 18 when the cover is opened, and firmly wraps the cylinder surface when the cover 12 is closed. A firm, even pressure of the sheet surface against the cylinder surface is insured by regulating the length of the sheet. The preferred length restrains the unhinged edge of cover 12 from touching the top surface of the cabinet 10 in the cover-closed mode. In this position, the cover weight applies tension to the sheet, causing it firmly to grip the cylinder surface.

The plastic cylinder 18 is held in place by end plates 19 that fit into the ends of the cylinder 18 and that are held down by spring clips 19a attached to the cabinet. The cylinder 18 rests on cradle blocks 19b, and the end plates 19 support a fluorescent lamp 22 along the horizontal axis of the cylinder 18. Lamp terminals 20 at each end of the lamp are connected to flexible leads 21 running to compartment 36. Special strips 24 are applied to the outside surface of the lamp to effect a linear light output from the lamp, as later described in detail. Two compartments are integrally molded into the cabinet 10. One compartment 26 is located in the lower part of the cabinet 10. In this compartment 26 there is a plate 30 having openings 32 and 34 through which ammonia gas circulates as indicated by the arrows in FIGURE 2. Another compartment 36 (FIGURE 4), at the right side of the cabinet and adjacent to compartment 26, houses certain electrical components, which will be described later.

Electrical components housed in the right-end compartment of cabinet 10 include a switch 42, a mechanical timer 44 (FIGURE 4), of the wound-spring variety, having a winding shaft 46 protruding through the top surface of the cabinet 10, and a pair of "normally-open" electrical contacts 48 and 49 which close when the mechanism is wound, and open when the mechanism is completely unwound.

A winding knob 50 fastened to the shaft 46 of the timer 44 is used in combination with a series of scale markers on the face of the knob to indicate the degree to which the timer has been wound, and thus the time elapsing between initial closing of the contacts 48 and 49, and the opening of these same contacts after unwinding of the timer mechanism.

The switch 42 (FIGURE 5) is operated by a push-button 43 with a pair of normally-open contacts 54 and 56, of the "momentary contact" variety, being also mounted on the top surface of the cabinet 10. Depressing the button 43 causes the contacts 54 and 56 to close; releasing pressure on the push-button 43 opens the switch contacts. Two ballast coils 58, consisting of windings of copper wire around individual iron-laminated core structures, are mounted within the compartment 36, and a conventional extension cord 60 with a plug 62 enters the compartment 36 through a fitting 64 in the rear wall of the cabinet 10 to allow connection to a wall receptacle with the required voltage rating.

End panels of the cover 12 are shaped so as to mask the light from a fluorescent tube lamp 22. Light rays 40, leaving the closed cover 12 through the aperture adjacent to the top surface of the cabinet 10, provide a "tell-tale," or pilot lamp light, to indicate when the lamp is lighted. The lamp 22 also emits ultra-violet light rays having a frequency or wave length of approximately 3600° Angstrom. Since such rays can be harmful to the unshielded eye, the design of the copier is specific, in that the entire lighted lamp is shielded by the cover 12 during operation.

The flexible sheet 16, although preferably of thin cellulose acetate and transparent, can be of any desired opacity, without affecting optimum results from the copier. Instead of acetate, the sheet can be made from latex, woven stretch nylon, or any elastic material woven or rolled into sheet form. When such truly elastic sheets are used, the cover 12 is provided with a positive mechanical stop against the top surface of the cabinet 10 when the cover is closed, and the cover weight is used to provide positive closure only, and does not cause pressure of the sheet 16 against the surface of the cylinder 18 in the same manner as previously described.

To make a copy or duplicate of an original page or document, the operator puts the original sheet in contact with a sheet of diazo-coated copy paper 65 (FIGURES 1 and 2) with the diazo-coated surface adjacent to the back, or unprinted side of the original paper. The two papers are then introduced into the space between the cylinder 18 and the wrapping sheet 16, while the cabinet cover 12 is in the opened position and against the stops 15 with the printed surface of the original paper in contact with the surface of the cylinder 18. The reference character 65 represents the original as well as the copy paper where the sheets are shown wrapping the cylinder. When the two papers are positioned between the cylinder 18 and the wrapping sheet 16, so that they have reached the limit of insertion at the point 66 where the wrapping sheet 16 is fastened to the top surface of the base cabinet 10, and is in contact with the surface at cylinder 18, the cover 12 is closed, and the wrapping sheet 16 forces both papers into close mutual contact and presses them firmly against the cylinder 18.

The knob 50 of the timer 44 is then wound to the desired exposure time interval, closing the electrical contacts 48 and 49 of the timer, and partially completing the power circuit to the fluorescent lamp 22. Depressing the momentary switch push-button 43 completes the electrical circuit by closing switch contacts 54 and 56, causing current to flow through the ballast coils 58 and the heater elements of the fluorescent lamp 22. After a brief interval, pressure on the button 43 is released, contacts 54 and 56 open, and current ceases to flow through the lamp heaters, and instead flows through the lamp, causing it to light. Light from lamp 22 goes through the wall of the transparent cylinder 18, continues through the surface of the original paper, continues through the thickness of the original paper, and continues through the coated surface of the diazo copy paper.

When exposure time is ended, as indicated by the complete unwinding of the timer 44, the timer contacts 48 and 49 open, shutting off the lamp current and causing the lamp to go out. The cover 12 is then opened, the exposed diazo copy paper is removed for processing in the compartment 26.

Figure 2:
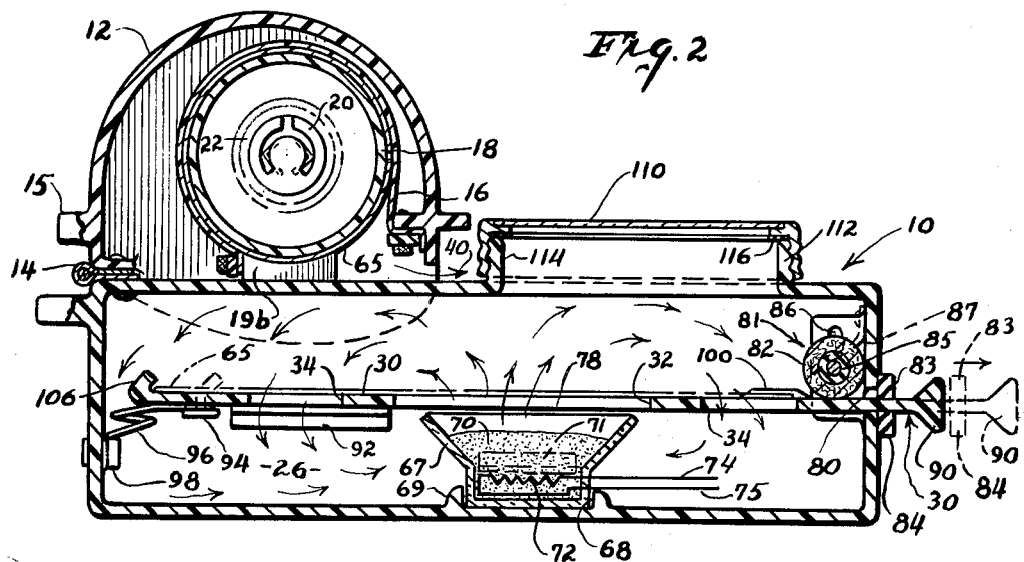
FIGURE 2 is a sectional view taken on the plans 2—2 of FIGURE 1.

In the construction shown in FIGURE 2 there is a cup 67 which fits into a socket 68 formed by a circular ridge 69 on the bottom of the cabinet 10. A compound is placed in the cup 67 for generating ammonia gas. In the construction shown this compound includes powder 70 and a pellet 71, but it will be understood that the compound can be entirely in powdered form or entirely in pellet form.

There is a heater element 72 in the bottom portion of the cup 67 and the powder 70 and pellet 71 are heated by the heater element 72 to cause the compound, of which the powder and pellet are made, to break down chemically and release ammonia gas into the chamber 26. The heater element 72 is constructed with heater wires and the conductors 74 and 75 connected in the electric circuit of the copier in the manner shown in FIGURES 5 and 6. If desired, an incandescent lamp can be used as the heater element.

To generate an ammonia gas atmosphere in the compartment 26 the compartment port cover 110 is removed and a pellet or lozenge 71, made of a powdered ammonium compound, is placed in proximity with, or in contact with, the heater element 72. When the heater element is supplied with current, the heat generated causes the ammonium compound pellet to change its state and to release ammonia gas which circulates through the compartment 26, as indicated by the arrows in FIGURE 2. These circulation paths are important since the operation of the invention depends on efficient establishment of an ammonia gas environment within the compartment 26, and the maintaining of an adequate supply of gas continuously as exposed diazo paper copies are inserted into the compartment for processing, and then withdrawn. The ammonia gas is used and replaced automatically as the result of the control of the heater element by the timer switch which controls the exposure time.

Access to the compartment 26 for plate 30 is through a longitudinal slot 80 in the front wall of the cabinet 10. (FIGURES 1 and 2). The slot 80 above the plate 30 is sealed by a roller 81 extending across substantially the full width of the compartment 26. The roller 81 preferably has flocking 82 in its circumferential surface for contact with the paper on the plate 30.

The roller 81 has an axle 85 which extends into slotted bearings 86 at opposite ends of the roller. The slots permit the roller 81 to move up and down and the axle 85 fits loosely in the bearings 86 and there are springs 87 urging the roller 81 into light contact with the front wall of the cabinet. These springs 87 and the weight of the roller 81 hold it in contact with the upper surface of plate 30 and the copy paper 65 when it is on the plate.

The partition plate 30 has a handle 90 at its forward end for pulling the plate 30 part way out of the cabinet for removing processed sheets and inserting new sheets into the compartment 26.

The plate 30, which serves as a tray for the sheets being processed, is supported at its forward end by the bottom of the slot 80, and is supported at its rearward end by angles 92 attached to the side walls of the cabinet. Contact of the bottom of plate 30 against the bottom of slot 80 serves as an additional seal to reduce gas leakage from the compartment 26. There is a fastening 94 near the rearward end of the plate 30.

There are sealing strips 83 and 84 attached to the top and bottom, respectively, of the plate 30 in front of the slot 80. These strips 83 and 84 may be made of sponge rubber weather stripping or other soft and gas proof material. When the partition plate 30 is in its innermost position, as shown in FIGURE 2, the strips 83 and 84 seal the full length of the slot 80 both above and below the plate 30. When the plate 30 is moved to pull these strips 83 and 84 away from the front of the cabinet, then the roller 81 serves as the seal, but it does not provide as tight a seal and some gas can escape from the compartment.

There is a spring 96 which is attached at its forward end to the fastening 94 and at its rearward end to a fitting 98 secured to the back wall of the cabinet. When the plate 30 is pulled forward by the handle 90, and the handle is then released, the spring 96 pulls the plate 90 back into the cabinet.

There are two ribs 100 extending upwardly from the plate 30 at each edge of the plate and near its forward end. These ribs serve the dual purpose of lifting the roller 81 when the plate 30 is pulled forward; and as guides when a piece of exposed diazo paper is inserted through the slot 80 for processing.

As the plate 30 is drawn forward, the beveled edges of the ribs 100 strike the roller 81, and as the plate 30 continues to move forward, the roller is lifted and supported by the top surfaces of the ribs 100, thus maintaining the slot 80 open for the free removal or insertion of a piece of diazo paper. Diazo paper 65 is inserted through the open slot 80 and is slid along the top surface of the plate 30, being limited at the rear by a restraining rib 106. After insertion of the paper, the handle 90 is released to permit the spring 96 to pull the plate 30 and the copy paper 65 into the compartment 26.

As plate 30 moves rearward, the roller 81 resumes its normal lowered position in which it contacts with the top surface of the plate 30. Ammonia gas in compartment 26 then acts to process the exposed diazo paper image, which can be seen through the transparent cover 110 that screws over a rim 112 surrounding an opening 114 in the top wall of the cabinet. There is a gasket 116 for preventing leakage of ammonia through the opening 114. This cover 112 is removed when new pellets or lozenges 78 are to be inserted into the cup 66 through the opening 32 in the plate 30.

After the image on the diazo paper appears, and is of the proper density, the handle 90 is pulled to withdraw the plate 30. The plate 30 is pulled forward far enough so that a short length of the copy paper covering some of the openings 34 is outside of the cabinet. During the pulling, the roller 81 is first raised by the plate ribs 100, then lowered to contact the copy paper 65. The paper 65 is then removed from the plate 30 by inserting a finger upward through one of the openings 32 and then grasping the paper to pull it forward out of the compartment 26. As the processed paper is pulled forward, the roller 81 remains in contact with the top surface of the paper and wipes away any surplus ammonia gas, thus reducing gas loss from the compartment to a minimum.

Operation of the invention as described permits the paper to be processed dry and does away with the necessity of liquids of any kind. There is no residue from the powder or pellets 78 on the surface of the paper and no danger whatever in handling the paper.

Action of the ammonia gas on the exposed diazo copy paper will cause the exposed images of letters or other information of the original to appear on the copy; but the time for this operation depends on the concentration of ammonia gas in the compartment 26, and varies from five to twenty seconds. Exposure times for copying various original sheets vary from thirty seconds to 180 seconds, depending on the sensitivity of the diazo paper and the opacity of the original paper.

Although a fluorescent lamp containing the proper phosphor inner coating and the proper glass jacket is suitable for the production of the ultra-violet light required to expose the diazo-coated copy paper, such lamps do not have a uniform emission of light along the entire length of the lamp, tube, or jacket. For this reason, a tube is used having a substantially greater length than the width of the paper to be copied or exposed. In addition, in order to prevent over exposure of the copy paper at the central portion of the lamp, a series of opaque rings or bands is impressed on the lamp jacket by tape, paint, etching or other means.

A lamp having a diameter of approximately one inch and an overall length of approximately eighteen inches, has been employed as a light source. Mathematical computations, followed by confirming experiments, show that opaque bands of approximately 3/16" in width, spaced approximately 3/4" on centers, effectively reduce the undesirable higher light emission from the central portions of a standard fluorescent lamp of this size, and produce a copy with substantially uniform exposure characteristics.

FIGURE 5 shows a circuit with two ballasts 58 and 58' for current limiting. Paralleling the ballasts effectively doubles the nominal lamp current, providing the necessary light for diazo copy paper exposure. Winding the timer 44 closes the timer switch; depressing the push button switch 42 allows current to flow through the lamp heaters; starting the arc discharge within the lamp is effected by releasing the button switch 42. Double the rated current flows through the lamp heaters with this method.

FIGURE 6 shows a current limiting circuit which is the same as FIGURE 5, except that the momentary switch is changed to a two-circuit switch having one pair of contacts 54' and 56' normally "open" and a second pair of contacts 58' and 59' normally "closed." After the timer 44 is wound, and the timer switch closed, the momentary switch button 42' is depressed, closing the circuit to the lamp heater through ballast 120 in the required fashion, but opening the circuit to ballast 122. In this manner only the nominally rated lamp starting current flows through the heaters, limited by the single ballast 120. When the switch button 42' is released, the ballast 122 is reconnected in parallel with the other ballast 120, doubling the lamp arc discharge current as designed. The ballasts are mounted in the right-hand compartment of the copier, as shown in FIGURE 4.

FIGURE 8 shows a modified form of the invention equipped to function with an ammonia solution instead of the dry pellets used in the construction illustrated in FIGURE 2.

A socket 130 is molded on the bottom of the cabinet 10 and this socket 130 has ribs 132 projecting for its inside wall, as shown in FIGURE 9. A quantity of ammonia solution 134 is contained in a jar 136 which has depressions 138 in its outside surface for receiving the ribs 132 of the socket 130. Thus the jar 136 is held against rotation in the socket 130.

The jar 136 has a top 140 which screws over threads on the upper end of the jar. A gasket 142 at the lip of the jar 136 prevents escape of ammonia when the cap 140 is on the jar and screwed down against the gasket 142. A tab 144 extends from the top of the cap 140 and provides a handle by which the jar 136 can be lowered into the cabinet when the cover 110' is removed from the opening 114. The large hole in plate 30 (FIGURES 1 and 8) provides clearance for lowering jar 136 into the socket 130. After the jar 136 is in place in the socket 130, the cap 140 is unscrewed by turning the tab 144. In order to prevent the cap 140 from being misplaced when the jar 136 is open, a projecting sleeve 150 is secured to the under side of the cover 110' and is provided with threads on which the cap 140 can be screwed. The position of the cap 140 on the sleeve 150 is shown in dotted lines in FIGURE 8.

After screwing the cap 140 on the sleeve 150, the cover 110' is quickly replaced and screwed down on the gasket 116 to prevent leakage of ammonia from the compartment 26.

Ammonia gas is released rapidly from the solution in the uncovered jar 136 and circulates through compartment 26 following the paths indicated by the arrows in FIGURE 2, and filling the compartment which becomes charged with ammonia gas within about two minutes after the cap 140 has been removed from the jar 136.

When all or most of the ammonia gas has been released from the solution 134, water still remains in the jar 136. The cover 110' is unscrewed, the cap 140 removed from the sleeve 150, and the cap 140 is then screwed back on the jar 136. The jar 136 is then lifted from the socket 130 by grasping the tab 144. The jar is discarded and a new jar, containing fresh ammonia solution, is inserted. Thus the operator never comes into contact with liquid ammonia solution, and no solution ever reaches any part of the cabinet. While the jar 136 could be refilled by the operator with fresh ammonia solution, this is not recommended, and the jar is intended to be disposable.

When using the dry process, illustrated in FIGURE 2, it is necessary to establish an initial gas atmosphere in the cabinet before performing the first processing operation on an exposed sheet. This is accomplished by setting the timer switch 44 for the maximum scale time. The heater element 72 (FIGURE 2) is powered through the timer switch and gas generation is thus started. Generation of gas stops when the timer switch 44 returns to its "off" position. During this initial charging cycle there is no necessity to depressed the button which lights the fluorescent exposure lamp.

After the compartment 26 has been charged with gas from the heated dry pellets or powder, copies may be made in the manner already described, and during each cycle, while the exposure lamp is lighted, current is supplied to the heater element 72 to release additional gas. However, because of the comparatively short exposure interval required by the average original material to be copied, gas is not liberated at the same rate as during the original charging period; but sufficient gas is released for replenishment purposes and to overcome the normal gas loss through the slot 80 during the operation of the copier.

To eliminate actual contact with chemical or pellets, as illustrated in FIGURE 2, and to operate the copier with dry powder instead of ammonia solution, but substantially in the same manner as shown in FIGURE 8, jars containing a gas producing powder may be used. FIGURE 10 shows such a construction in which a jar 160 is constructed with a groove 162 extending across the full width of the bottom of the jar 160. There are notches 164 in the sides of the jar 160 near its lower end for receiving pins 166 which prevent the jar from rotating about a vertical axis when the cover is screwed or unscrewed from the upper end of the jar. It will be understood that the jar 160 has a cover similar to that shown in FIGURE 8.

The pins 166 are rigidly connected with a base plate 168 that rests on a bottom 170 of the cabinet 10. An electric heater unit 172 is attached to the base plate 168 by fastenings 174 extending through brackets 176 at opposite ends of the heater unit 172. The height and width of the heater unit 172 are chosen to fit into the groove 162 in the bottom of the jar 160. If desired, this heater unit can be made to fit snugly into the groove 162 so that no other means are necessary to prevent the jar 160 from rotating when the cover is being screwed on or off the jar.

FIGURES 14 and 15 show another modified form of jar for holding material from which ammonia gas can be obtained. A jar 194 containing a gas producing powder has notches 196 on opposite sides of its peripheral side wall for receiving the vertical portions of brackets 198 secured by fastenings 200 to a base 202.

The jar 194 has a well 204 in its bottom for receiving an electric heater 206 which is rigidly connected to and extends upwardly from the base 202. Electrical conductors 208 and 210 supply power to the electrical heater 206.

The base 202 rests on the bottom 170 of the housing; and in the preferred construction the base 202, like the base 168, is made of ceramic material which is an electrical insulator and also a heat insulator for limiting transfer of heat from electrical heater unit to the bottom of the housing.

FIGURES 12 and 13 show the knob 50 on an enlarged scale. This knob fits over a non-circular upper end 180 of the shaft 46. In the construction illustrated, the upper end 180 is square, but it can be round and provided with a key or can be of various other constructions to make the knob 50 and shaft 46 rotate as a unit. There are numerals 182 on the top surface of the knob 50 at angularly-spaced regions around the circumferences of the knob.

A stud 184 extends upward from the housing at a fixed location near the circumference of the knob 50. This stud 184 has a reference line 186 which is used in conjunction with the numerals 182 of the knob to indicate the extent to which the knob has been rotated.

There is a pointer 190 located on top of the knob 50. This pointer is held in place by a screw 192 which threads into the upper end of the shaft 46. The screw 192 holds the pointer 190 against the surface of the knob with enough friction so that the pointer 190 does not turn freely but can be turned by hand into any desired position.

When using the copier of this invention, some experimentation may be necessary to determine the ideal exposure for a particular document and with each successive exposure setting of the knob 50, the pointer 190 can be moved into position to indicate the extent to which the knob was turned to obtain that exposure. For example, the knob in FIGURE 12 has been turned into position to obtain an exposure of two and a half time units; and the pointer 190 is set at two and a half. As the knob 50 rotates clockwise to bring the zero legend into alignment with the fixed line 186, at the end of the exposure period, the pointer 190 will have moved as a unit with the knob 50 and will still point to the two-and-a-half time unit indication on the knob. If it is desired to repeat the same exposure, for another copy of the same document, or for printing another document of similar opacity, the operator merely turns the knob 50 to bring the pointer 190 back into the position shown in FIGURE 12, and this makes it unnecessary to remember the time of the last exposure.

The invention has been illustrated and described, but changes and modifications can be made and some features can be used in different combinations without departing from the invention as defined in the claims.

What is claimed is:

1. Apparatus for making contact prints including a housing having a translucent support on which a sheet to be copied is placed in contact with a light-sensitive sheet, a light behind the translucent support, a developer chamber in the housing extending under the light and the translucent support and separated therefrom by an opaque and impervious wall, the chamber extending forward beyond the translucent support an opening in the front of the chamber, a plate that forms a partition in the chamber generally parallel to the opaque wall, the plate being movable in the chamber and into position to extend for a substantial distance out of the chamber through said opening for insertion of an exposed sheet through the opening and onto the surface of the plate, sealing means around the opening for preventing escape of gas from the chamber when the plate is moved back into a retracted position with respect to the opening, and means within the chamber for generating an atmosphere of gas for developing the light-sensitive paper.

2. The apparatus described in claim 1 characterized by a container within the chamber under the plate for containing material that evolves the gas, the plate having perforations therein for the circulation of the gas on different sides of the plate.

3. The apparatus described in claim 2 characterized by a heater adjacent to the container causing the generation of gas from a solid pellet located in the container.

4. The apparatus described in claim 1 characterized by the sealing means including an obstruction that extends over a portion of the opening, the obstruction being movable into position to leave the opening unobstructed for the entrance of sheets into the chamber for development, and into its unobstructing position when the plate is moved abutments on the plate in position to shift the sealing means forward and partway out of the chamber.

5. The coyping apparatus described in claim 2 characterized by the container being a jar with a depression in an outside surface thereof, a support for the jar including abutment surfaces that prevent the jar from rotating about its longitudinal axis, and a screw cap at the top of the jar, the heater being located in the depression when the jar is placed on said support.

6. The copying apparatus described in claim 2 characterized by the container being a cup for holding powder or pellets made of an ammonium compound, the heater being located in the cup and in position to contact with the powder or pellets in the cup.

7. Apparatus described in claim 1 characterized by a window in the top of the housing and through which an operator can watch the development of paper in the developer changer.

8. In copying appartus for making diazo prints, a housing having a top for supporting an exposure station, a developer chamber within the housing under said top and in which the diazo paper is exposed to ammonia fumes, the chamber having a front opening spaced downward from the top and through which the paper is inserted into the chamber and withdrawn therefrom, a holder in the chamber for an ammonia-producing substance, and a heater adjacent to the holder for activating said substance characterized by a timer for determining the exposure of the diazo paper when making a copy, and an electric circuit connected with the timer and supplying power to the heater to generate ammonia fumes in the developer chamber each time the timer is operated to expose the diazo paper in making a copy whereby there is gas in the developer chamber after each operation of the timer.

References Cited by the Examiner
UNITED STATES PATENTS

| | | | |
|---|---|---|---|
| 910,832 | 1/09 | Lukacsevics | 95—77.5 X |
| 2,364,580 | 12/44 | Young | 95—77.5 X |
| 2,421,150 | 5/47 | Jacobson | 95—77.5 X |
| 2,535,145 | 12/50 | Langdon | 95—73 |
| 2,546,482 | 3/51 | Van Der Grinten | 95—77.5 |
| 2,907,259 | 10/59 | Horn et al. | 95—77.5 |
| 3,001,463 | 9/61 | Reick | 95—77.5 |
| 3,107,596 | 10/63 | Arnold et al. | 95—77.5 |

EVON C. BLUNK, *Primary Examiner.*

UNITED STATES PATENT OFFICE
CERTIFICATE OF CORRECTION

Patent No. 3,203,333                                                 August 31, 1965

Walter Robert Hicks

It is hereby certified that error appears in the above numbered patent requiring correction and that the said Letters Patent should read as corrected below.

Column 8, line 60, beginning with "and into" strike out all to and including "the chamber." in line 62, same column 8, and insert instead -- and abutments on the plate in positions to shift the sealing means into its unobstructing position when the plate is moved forward and partway out of the chamber. --.

Signed and sealed this 29th day of March 1966.

(SEAL)
Attest:

ERNEST W. SWIDER
Attesting Officer

EDWARD J. BRENNER
Commissioner of Patents